Figure 2:
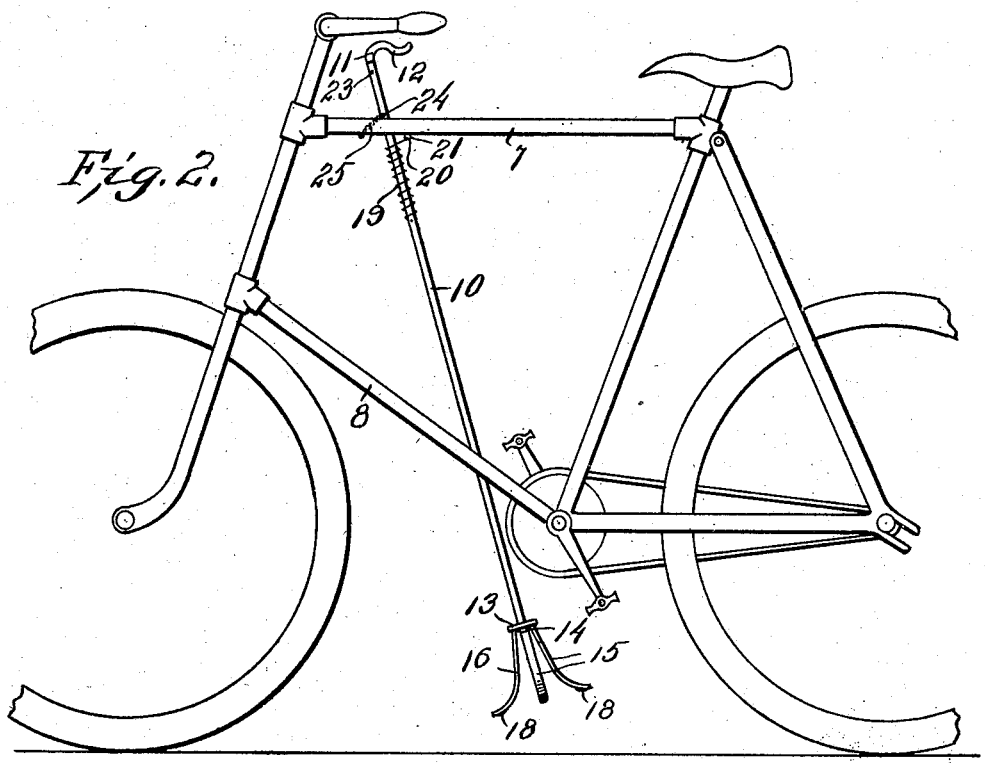

No. 873,278. PATENTED DEC. 10, 1907.
J. J. WALTERS.
BICYCLE ATTACHMENT.
APPLICATION FILED MAY 2, 1907.
2 SHEETS—SHEET 1.
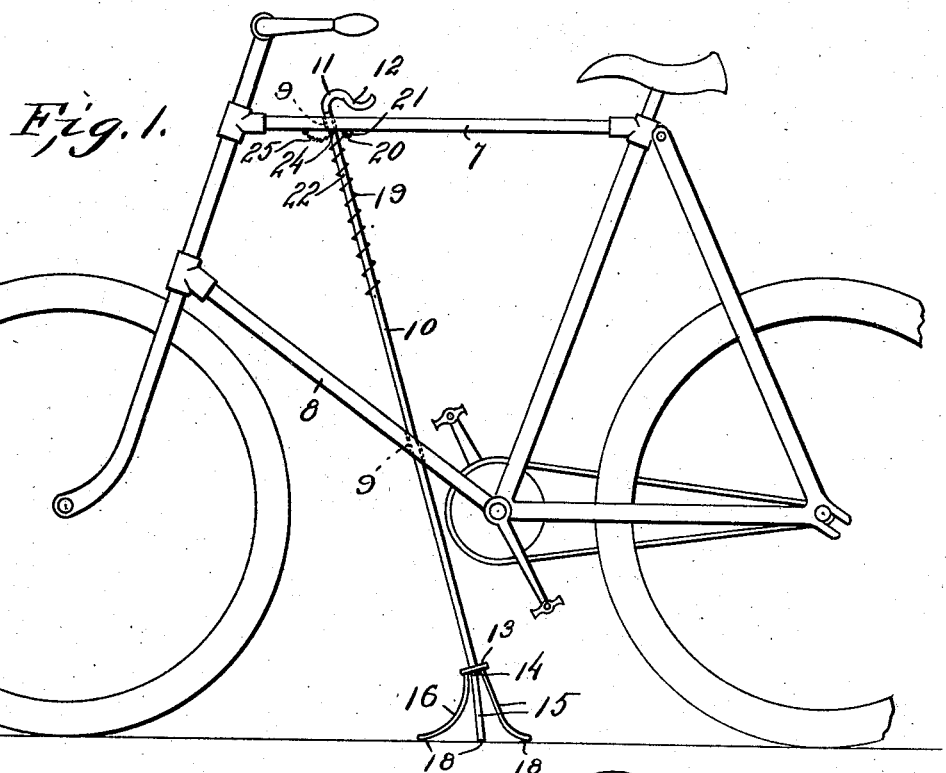
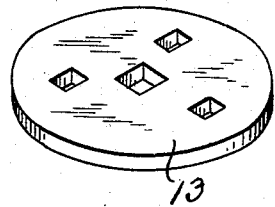
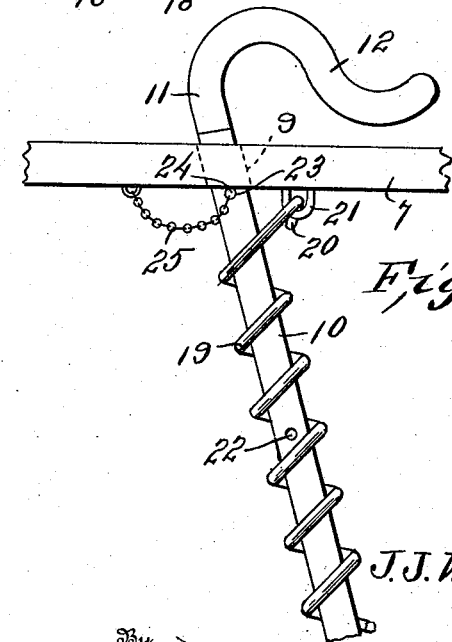
Witnesses
Inventor
J. J. Walters,
By
Attorneys No. 873,278. PATENTED DEC. 10, 1907.
J. J. WALTERS.
BICYCLE ATTACHMENT.
APPLICATION FILED MAY 2, 1907.

2 SHEETS—SHEET 2.

Witnesses

Inventor
J. J. Walters,
By
Attorneys

UNITED STATES PATENT OFFICE.

JOSEPH J. WALTERS, OF BINGHAMTON, NEW YORK.

BICYCLE ATTACHMENT.

No. 873,278.    Specification of Letters Patent.    Patented Dec. 10, 1907.

Application filed May 2, 1907. Serial No. 371,488.

*To all whom it may concern:*

Be it known that I, JOSEPH J. WALTERS, subject of the King of England, residing at Binghamton, in the county of Broome, State of New York, have invented certain new and useful Improvements in Bicycle Attachments; and I do hereby declare the following to be a full, clear, and exact description of the invention, such as will enable others skilled in the art to which it appertains to make and use the same.

The present invention relates to improvements in bicycle supports, and it aims to provide a device of that nature which may be readily attached to a bicycle of any conventional type, and which is adapted when in place thereon and in operative position, to effectually support the bicycle.

To this end, the invention, briefly described, resides in the provision of an upwardly and forwardly inclined rod movable endwise through alining diagonal openings formed in the upper and lower bars of the bicycle frame and carrying at its lower end a plate having a series of feet secured thereto, one of which is forwardly inclined and disposed directly beneath the lower frame bar, whereby the rod, in its lowered position, effectually supports the bicycle, as above stated.

The invention further resides in the provision of an elastic anti-slipping pad inserted in the ground-engaging portion of each of the feet above referred to.

The invention will be readily understood from a consideration of the following detailed description, and its preferred embodiment is illustrated in the accompanying drawings, in which like parts are designated by corresponding reference numerals in the several views.

Figure 5:
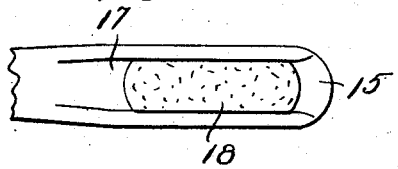
Figure 6:
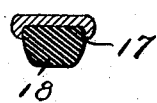

Of the said drawings—Figure 1 is a side elevation of a bicycle provided with a supporting rod, the latter being shown in its lowered or operative position. Fig. 2 is a similar view, showing the rod in its raised or inoperative position. Fig. 3 is an enlarged perspective view of the foot carrying plate. Fig. 4 is an enlarged detail view of the upper end of the rod, showing the spring and actuating handle carried thereby. Fig. 5 is a bottom view of one of the feet. Fig. 6 is a cross-section through Fig. 5.

Referring more particularly to the drawings, the upper and lower horizontal bars 7 and 8 of the bicycle frame are shown as provided with alining forwardly-inclined or diagonal openings 9 formed therethrough, in which an endwise movable rod 10 is slidably engaged, the opposite ends of said rod being preferably squared so as to prevent rotation of said rod during its movement through the similarly shaped openings above referred to. The upper end of said rod, which is disposed at all times above the frame bar 7, carries a detachable handle 11, provided with a rearwardly and downwardly curved extension 12, whose extremity is bent slightly upwards, as shown. The opposite end of said rod carries a circular plate 13 provided with a central opening through which the threaded, reduced end 14 of said rod extends, the plate being held in place by a nut which is likewise fitted upon the rod end. Plate 13 is in turn provided with a pair of rearwardly-extending diverging feet 15, and a forwardly-extending foot 16, which is disposed directly beneath the frame bar 8, said feet having their upper ends fitting in openings formed in the plate 13 and likewise retained in place by nuts. The several feet above referred to, which are curved towards their free ends, are formed of spring steel and have the under faces of said curved portions grooved longitudinally, as indicated by the reference numeral 17, Figs. 5 and 6, for the reception of an elastic tread or anti-slipping pad 18, which is held in place therein by any preferred means.

The rod 10 is normally held in raised or inoperative position by the action of a retractile coil-spring 19, which embraces said rod and is connected thereto at its lower end, the opposite end of said spring carrying a hook 20 for detachable engagement with a depending eye-bolt 21, which is secured to the frame bar 7 adjacent the diagonal opening 9 therein. Said rod is further provided with a pair of horizontal openings 22 and 23, arranged one above the other, in which a pin 24 carried by a small chain 25 connected to the frame bar 7 is adapted for interchangeable engagement according as the rod is in raised or lowered position.

It will be apparent from the foregoing, therefore, that when the rider desires to rest, it is merely necessary for him, after having removed the pin 24 from the lower opening 22, to press downwardly upon the rod handle 11, thus forcing the rod downwardly against the action of the spring 19, until the feet carried by the plate 13 contact with the ground. The pin 24 is then engaged in the opening 23, thus holding the rod in its lowered position, the feet serving to completely support the machine.

In starting the machine, the pin is withdrawn from the upper opening, when the spring will at once raise the rod to its normal position, the pin being then engaged in the lower opening. The hooked end 20 of the spring is preferably disengaged from the eye bolt 21 after the bicycle is started.

What is claimed, is—

1. The combination, with a bicycle frame having alining openings formed diagonally through its upper frame bars, of a rod slidable through said openings; a plate carried by said rod at its lower end; radially-disposed ground-engaging members; secured to said plate; means for normally holding said rod in raised position; means carried by said rod for lowering the same against the action of said first-mentioned means; and means for retaining the rod in lowered position.

2. The combination with a bicycle frame having upwardly and forwardly inclined openings formed through its upper and lower frame bars in alinement with each other; a rod movable endwise through said openings; a plate secured to the lower end of said rod; radially-disposed ground-engaging feet carried by said plate, each foot having its lower end grooved and provided with an elastic tread; means for normally holding said rod in raised position; means carried by said rod for lowering the same against the action of the first-mentioned means; and means for retaining the rod in lowered position.

3. The combination with a bicycle frame having upwardly and forwardly inclined openings formed through its upper and lower frame bars in alinement with each other; each of said openings being rectangular in cross-section; a rod movable endwise through said openings and having its opposite ends squared, to prevent its rotation during such movement; a plate secured to the lower end of said rod; radially-disposed ground-engaging members secured to said plate; means for normally holding said rod in raised position; means carried by said rod for lowering the same against the action of the first-mentioned means; and means for retaining the rod in lowered position.

4. The combination with a bicycle frame having upwardly and forwardly inclined openings formed through its upper and lower frame bars in alinement with each other; each of said openings being rectangular in cross-section; a rod movable endwise through said openings and having its opposite ends squared, to prevent its rotation during such movement; a plate secured to the lower end of said rod; radially-projecting ground-engaging feet carried by said plates, each foot having its lower end grooved and provided with an elastic tread, one foot being forwardly inclined and disposed directly beneath the lower frame bar; means for normally holding said rod in raised position; means carried by the rod for lowering the same against the action of said first-mentioned means; and means for retaining the rod in lowered position.

In testimony whereof, I affix my signature, in presence of two witnesses.

JOSEPH J. WALTERS.

Witnesses:
   Mrs. Cassandra Boles,
   Mrs. J. Palmer.